March 20, 1956   B. NAGLER   2,738,844
STEERING MECHANISM FOR ROTARY WING AIRCRAFT
Original Filed Oct. 23, 1951   2 Sheets-Sheet 1

INVENTOR
Bruno Nagler
BY
ATTORNEYS

INVENTOR
Bruno Nagler

United States Patent Office 2,738,844
Patented Mar. 20, 1956

2,738,844

STEERING MECHANISM FOR ROTARY WING AIRCRAFT

Bruno Nagler, Greenwich, Conn., assignor to Nagler Helicopter Co., Inc., White Plains, N. Y.

Original application October 23, 1951, Serial No. 252,647. Divided and this application December 2, 1954, Serial No. 472,592

1 Claim. (Cl. 170—160.27)

This invention relates generally to a steering mechanism for rotary wing aircraft as disclosed in my copending application Serial No. 252,647 filed October 23, 1951, entitled "Aircraft" and of which this application is a division.

In aircraft of the rotary wing type, the construction of the members connecting the rotating wing assembly to the suspension rig of the aircraft is usually very complicated and expensive. It is the object of this invention to provide a simple, light and effective steering mechanism for rotary wing aircraft whereby the rotating wing assembly may be tilted with reference to the suspension rig so that the aircraft may be easily maneuvered.

Broadly I propose to provide a spindle connected at one end to the rotating wings and journaled at the other end in a ring having a spherical outer edge. The ring in turn is slidingly mounted inside a spherical socket bearing which is firmly mounted to the suspension rig of the aircraft. The spindle is journaled in a self-aligning bearing carried on the top of the socket bearing and again to a self-aligning bearing carried in the spherical socket ring. A steering bar is connected to the ring so that when the ring is tilted by the bar, it will cause the spindle and attached blades to tilt in an opposite direction around the center of the self-aligning bearing carried in the top of the socket bearing. Referring to the drawings:

Figure 1:
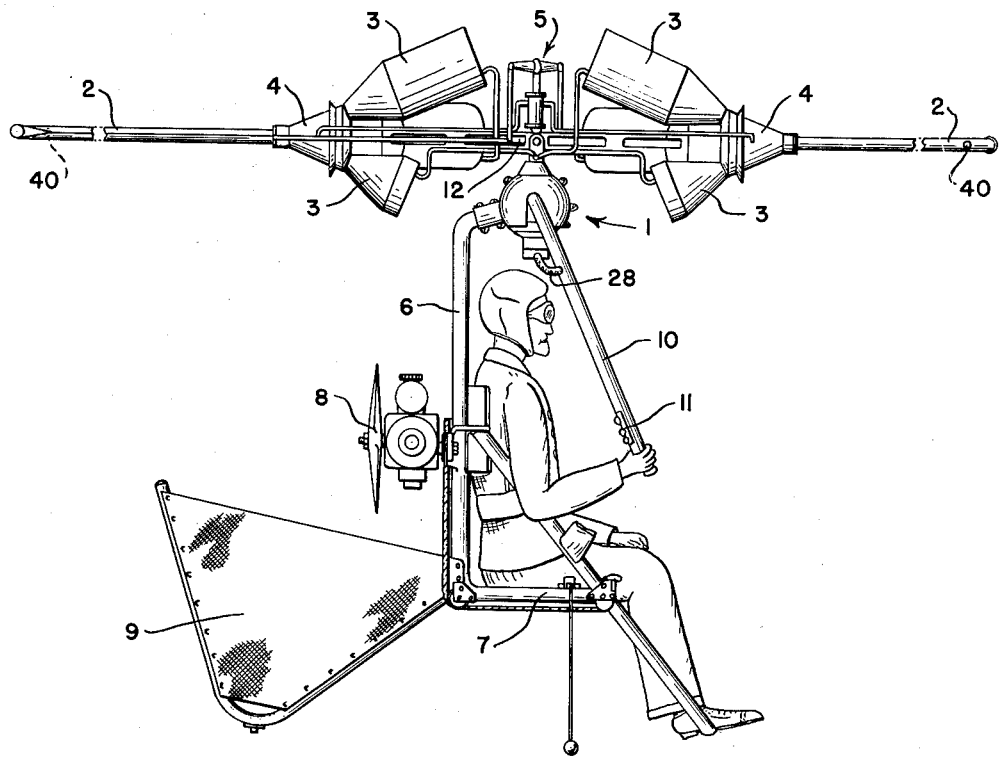
Fig. 1 shows a side view of a rotary wing aircraft using my new steering mechanism.

Referring in detail to Fig. 1, 1 denotes generally the steering mechanism of my invention as applied to a rotary wing aircraft in which the rotating force for the supporting wings is supplied by rocket power. The supporting rotating wings 2 have mounted thereon canisters 3 which carry the fuel which in turn is burned in combustion chambers 4. The gases so generated are expelled from the orifices 40 positioned at the trailing edge of the wing tips to supply thrust for rotating the wings. A pitch control means 5 controls the pitch of the blades 2 in order to give the proper pitch for climbing and gliding. Steering mechanism 1 is attached to suspension rig 6 which carries the pilot's seat 7, an engine 8 which extends gliding range of the aircraft, and a stabilizer fin 9. The rotating blades are tilted by a steering bar 10 on which are mounted controls 11 by which the pilot may electrically control the burning of the several rocket fuel charges.

Figure 2:
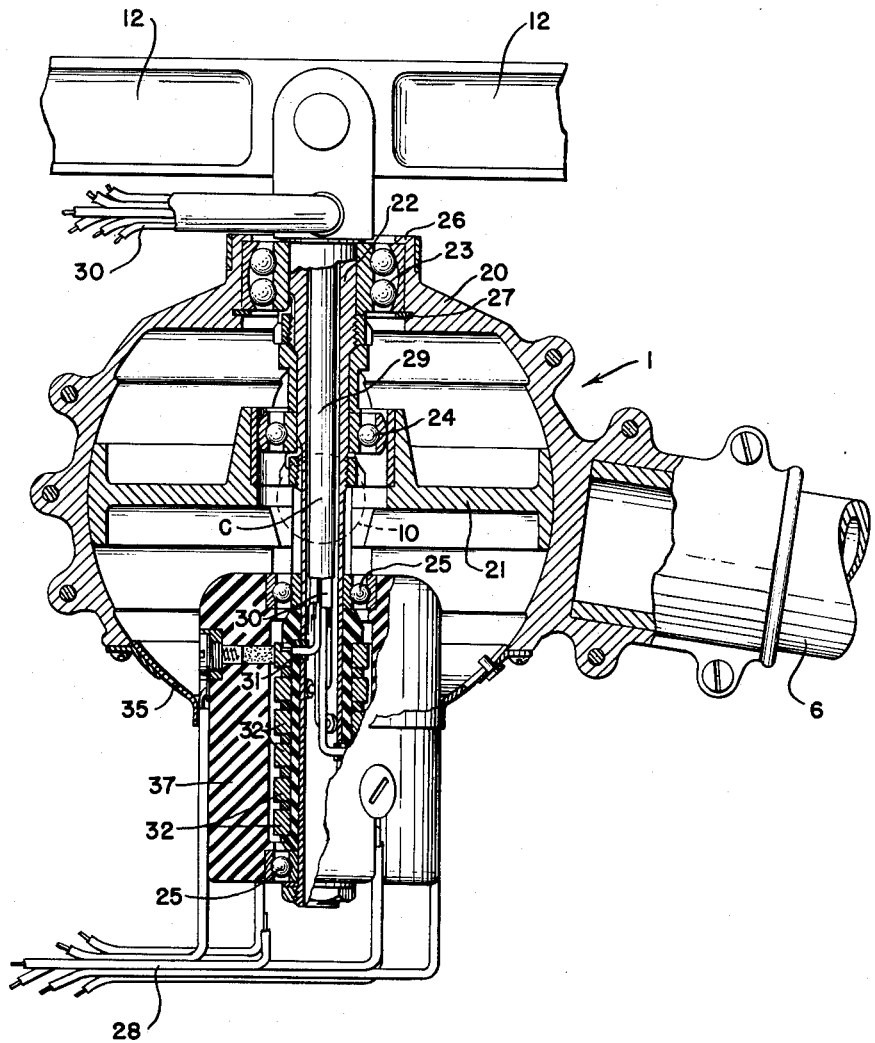
Fig. 2 is an enlarged side sectional view of the steering mechanism shown in Fig. 1.

In order to more clearly see the details of my new steering mechanism, reference is now made to Fig. 2 wherein steering mechanism 1 is shown attached to the suspension rig 6 and to the shanks 12 of the rotating blades 2. Steering mechanism 1 comprises a spherical socket bearing 20 within which is concentrically mounted a ring 21 having a spherical external configuration slidingly engaging the inner surface of the socket bearing 20. The shanks 12 of the blades are connected to a hollow spindle 22 which is journaled in self-aligning bearings 23, 24 and in a rigid bearing 25. Self-aligning bearing 24 is mounted inside of ring 21. The point of contact of the bearing 24 with the ring is above the center of the socket bearing 20 so the bottom of the spindle 22 will be displaced when the ring 21 is tilted about its center. Self-aligning bearing 23 serves as a thrust bearing and is held in firm position to socket bearing 20 by means of a shoulder 26 carried on the socket bearing and also by means of a retaining ring 27. Control wires 28 run from control point 11 carried on the steering bar to a collector ring assembly 37 which is journaled on spindle 22 by bearing 25. An electrical conduit 29 extends inside of hollow spindle 22 and carries therein control wires 30. Wires 30 are connected to brushes 31 which in turn are in contact with the collector rings 32 carried in the collector ring assembly. The control wires 20 extend along the shanks 12 to the canisters 3 and to the combustion chamber 4. A flexible dust cover 35 is attached to the collector ring assembly 37 in order to keep dust, moisture, etc. out of the interior of the socket bearing assembly.

Figure 3:
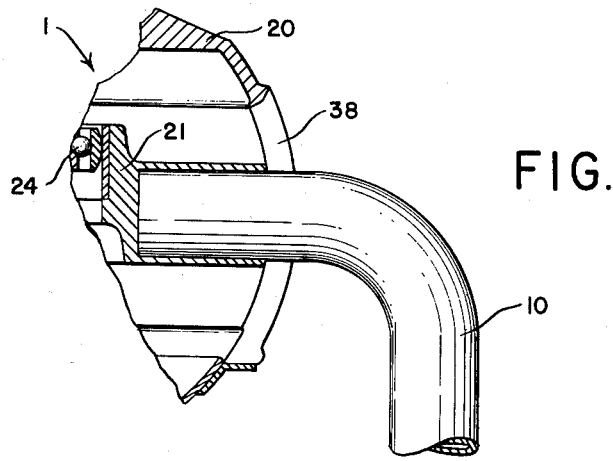
Fig. 3 is an enlarged sectional view of a portion of the steering mechanism of Fig. 1 showing the detail of the attachment of the steering mechanism.

Referring to Fig. 3, it is seen that steering bar 10 is firmly attached to ring 21. A cut-out 38 is made in the side of socket bearing 20 so that steering bar 10 may be free to move the ring 21. The angle at the top of the steering rod 10 where it enters the socket bearing 20 through cut-out portion 38 permits controlled tilting of the ring 21 in any desired direction. A dust cover similar to cover 35 may be attached to the steering bar in order to keep the system dust proof.

In operation, it is seen that as steering bar 10 is moved, ring 21 will be made to move about the center C of the socket bearing 20. As the point where the bearing 24 contacts the spindle 22 is above the center C of the socket bearing 20, it will cause the bearing 24 and therefore spindle 22 to move laterally as the ring 21 displaces it. Spindle 22, however, is tiltable about the center of bearing 23, so the result is that when ring 21 is tilted in one direction, it will cause the spindle 22 and atttached blades 2 to tilt in the opposite direction. This in turn will cause a longitudinal sliding movement of the spindle 22 and attached bearing 24 with respect to ring 21. The collector ring assembly 37 will be tilted with the spindle 22 as it is held to the spindle by the rigid bearing 25. It is readily seen that the tilting of spindle 22 and the attached rotating blades 2 will cause an easily regulated steering effect upon the aircraft.

While I have shown my steering mechanism attached to an aircraft of the rotary wing type wherein the blades are turned by rocket force, it is obvious that the blades could be turned by any other appropriate means and still be within the scope of the invention.

I claim:

A steering mechanism for an aircraft of the rotary wing type comprising a suspension rig, a spindle, a blade assembly for lifting said aircraft mounted on one end of said spindle and adapted to rotate with said spindle, and a spherical socket bearing fixed to said suspension rig in which the other end of said spindle is journaled, said spherical socket bearing having a self-aligning bearing at the top thereof within which said spindle is journaled, a spherical surfaced ring within said socket bearing and concentric thereto having its spherical surface slidingly engaging the spherical inner surface of said socket bearing, and a self-aligning bearing concentrically mounted within and to said ring in an axially displaced position along the spindle from the center of said ring, and means for moving said ring within said socket bearing.

References Cited in the file of this patent

UNITED STATES PATENTS

| | | |
|---|---|---|
| 2,633,925 | Bates | Apr. 7, 1953 |
| 2,658,575 | Stone | Nov. 10, 1953 |